United States Patent [19]

Fontana

[11] Patent Number: 4,702,624
[45] Date of Patent: Oct. 27, 1987

[54] FLANGED HALF BEARING

[75] Inventor: Mario Fontana, Cuorgnè, Italy

[73] Assignee: Federal-Mogul Corporation, Southfield, Mich.

[21] Appl. No.: 877,055

[22] Filed: Jun. 23, 1986

Related U.S. Application Data

[62] Division of Ser. No. 624,901, Jun. 26, 1984, Pat. No. 4,644,624.

[30] Foreign Application Priority Data

Jul. 21, 1983 [IT] Italy .................................. 67789 A/83

[51] Int. Cl.$^4$ ........................... F16C 9/02; F16C 33/14
[52] U.S. Cl. .................................... 384/294; 384/276; 384/429
[58] Field of Search ............... 384/288, 294, 420, 276, 384/275, 295, 296, 429

[56] References Cited

U.S. PATENT DOCUMENTS

| | | | |
|---|---|---|---|
| 3,713,714 | 1/1973 | Hill et al. | 384/294 |
| 3,972,576 | 8/1976 | Hill | 384/276 |
| 4,017,127 | 4/1977 | Smith et al. | 384/294 |
| 4,288,895 | 9/1981 | Campbell | 384/276 X |

FOREIGN PATENT DOCUMENTS

| | | | |
|---|---|---|---|
| 2528576 | 1/1976 | Fed. Rep. of Germany | 384/296 |
| 1168914 | 10/1969 | United Kingdom | 384/276 |

Primary Examiner—Stuart S. Levy
Assistant Examiner—Thomas R. Hannon
Attorney, Agent, or Firm—Lawrence J. Shurupoff; Robert F. Hess

[57] ABSTRACT

A flanged half bearing includes a plain half bearing rigidly connected to a pair of flanges by projection welds. All finishing operations are carried out on the separate bearing parts prior to assembly so that a finished part results after welding. Each flange is provided with a protrusion which collapses during the projection welding process. Projection welding prevents damage to the bearing antifriction material and also prevents deformation of the bearing parts during welding.

6 Claims, 6 Drawing Figures

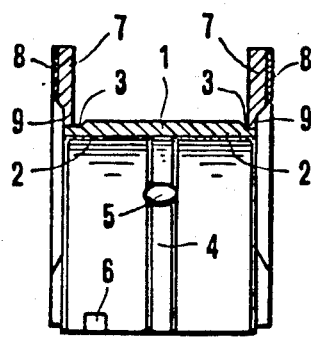
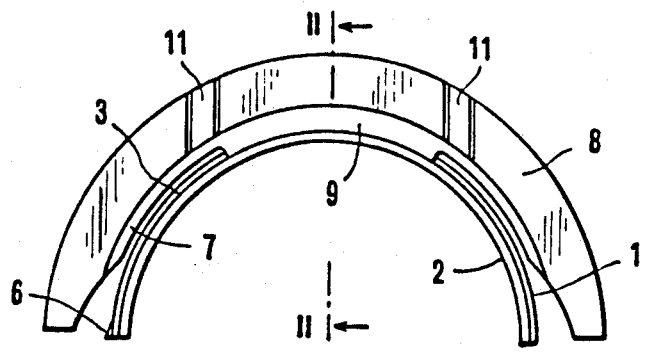
FIG.2  FIG.1
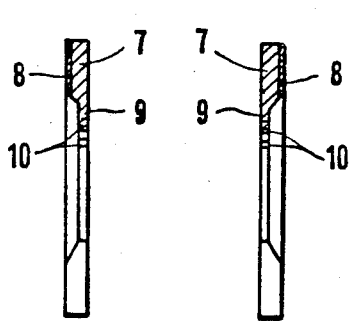
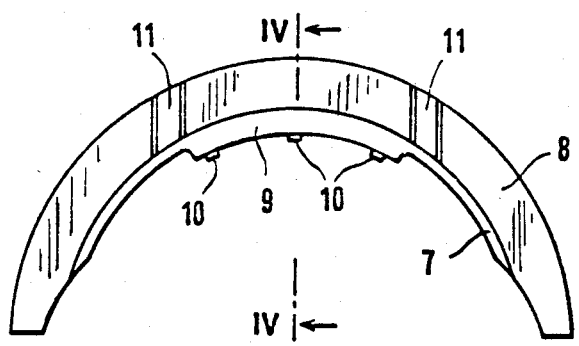
FIG.4  FIG.3
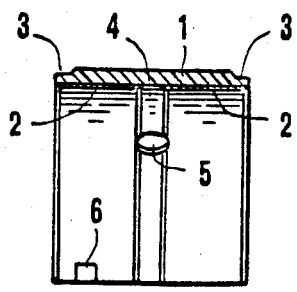
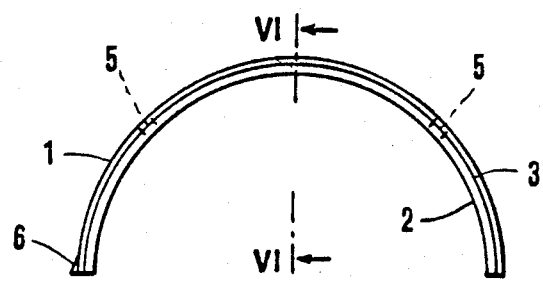
FIG.6  FIG.5

FLANGED HALF BEARING

This is a division of application Ser. No. 624,901, filed June 26, 1984, now U.S. Pat. No. 4,644,624.

BACKGROUND OF THE INVENTION

This invention relates to half bearings with flanges rigidly connected thereto by projection welding.

In various applications, and mainly for pivotally supporting the crankshafts of internal combustion engines, it is necessary to use radial bearings integrated by flanges acting as thrust bearings, and owing to assembly requirements the bearings must be subdivided in two parts. Half bearings and separate flanges may be used for each pivotal supporting point, but this method requires the separate installation of three components and therefore it gives rise to long working times and it is not suitable for mechanized assembly processes. Half bearings have been proposed, to which the respective flanges, in the form of half rings, are weakly secured by means of slightly fixed joints. These half bearings with flanges weakly secured thereto allow reducing the manual assembly times, but they are still not suitable for a mechanized assembly process, due to the insufficient resistance of the connection between the half rings and the half bearing. The mechanical grasping devices used in mechanized assembly operations cannot grasp the pieces with a human sensibility, and they often damage the pieces if these are not of a sufficient sturdiness.

To allow a mechanized assembly, half bearings with integral flanges are normally used, which are obtained from a steel sheet plaque coated, on one of its faces, with an antifriction material. However, the manufacture of such a complex piece from a plane coated plaque requires a long process of gradual bending with simultaneous bulging, which leads to very high production costs. In view of reducing these costs it has been proposed to separately manufacture the half bearing and the two half rings, and then to connect these three components by means of folded seamings. However, the seaming operations give rise to considerable deformations of the parts, so that both the half bearing with integral flanges and the half bearing with seamed flanges have to be subjected to the finishing operations when they already have assumed their complex final configuration; this implies the use of complex and expensive equipment, and long working times, and accordingly high production costs.

BRIEF SUMMARY OF THE INVENTION

The object of the present invention is to allow a rationalization of the manufacture of the half bearings with flanges rigidly connected thereto, and thereby a considerable reduction of the production costs, yet obtaining an article in which the connection between the half rings and the half bearing is sufficiently resistant to allow a mechanized handling thereof.

This object is attained, in accordance with the invention, by the fact that the manufacturing process consists in producing a half bearing having no flanges thereon, and separately producing a pair of thrust half rings; in carrying out on the separate components all the required working and finishing operations; and, finally, in rigidly connecting the half rings to the half bearing, in a mutually correct position, by a welding process carried out by projection or by condenser discharge.

Because the half bearings and the half rings are produced separately, the equipment cost and the production cost of the parts are reduced. A similar reduction in cost is obtained in the machining and finishing operations of the components. These operations are carried out on pieces having a very simple configuration, require simple inexpensive equipment and result in short working times. Finally, welding by projection or by condenser discharge is carried out by inexpensive equipment, with high precision and very short working times, which are in the order of a fraction of a second.

Because of the welding method chosen, no deterioration of the antifriction material layer applied onto the support steel occurs, nor any deformation of this latter, so that no further machining is required on the finished piece when it has achieved its final complex shape which would render expensive its machining.

The spot welding of the thrust half rings onto the half bearing provides a connection whose sturdiness is certainly sufficient to allow any mechanical handling of the flanged half bearing during the assembly of an engine.

BRIEF DESCRIPTION OF THE DRAWING

These and other features and advantages of the subject of the invention will be more clearly apparent from the following description of an embodiment, given by way of a non limiting example, and diagrammatically shown in the annexed drawing, in which:

FIG. 1 is an axial view of a flanged half bearing manufactured according to the invention;

FIG. 2 is a sectional view thereof, taken along the line II—II of FIG. 1;

FIG. 3 is a view of a separate thrust flange;

FIG. 4 is a sectional view, taken along the line IV—IV of FIG. 3, of a pair of thrust flanges;

FIG. 5 is a view of the separate half bearing; and

FIG. 6 is a sectional view thereof, taken along the line VI—VI of FIG. 5.

DETAILED DESCRIPTION OF A PREFERRED EMBODIMENT

In accordance with the invention, in order to produce a flanged half bearing (FIGS. 1 and 2) the respective plain (i.e. not yet flanged) half bearing (FIGS. 5 and 6) and a pair of separate thrust flanges (FIGS. 3 and 4) are separately manufactured. The half bearing and the flanges, furthermore, are completely worked and finished still remaining separate, and hence produced, in the most simple and economical way. The figures from 3 to 6 show these separate components in their finished condition. The half bearing is formed by a steel plate 1 with an antifriction layer 2, bent by 180° and machined on a lathe to form two recessed axial seats 3 at opposite ends of the plain bearing for mounting the flanges and, if needed, a central lubrication groove 4, into which radial holes 5 open. The antifriction layer 2 as shown in FIG. 2 extends to the ends of the steel plate 1 and beneath the mounting seats 3. During this operation, also the antifriction layer 2 is finished exactly to a predetermined diameter. When required, a notch 6 may also be formed, which serves to ensure the correct orientation of the half bearing during the assembly operation.

Each thrust half ring is made of a steel plate 7 provided with an antifriction layer 8, which plate is plane, sheared to the desired semiannular configuration, and subjected to the machining operations required. Each half ring has, on the inner side, a central arcuate portion 9, whose inner radius is equal to that of the outer radius of half bearing seats 3, and this inner radius of the central portion 9 is intended to be welded to and abut the half bearing as shown in FIGS. 1 and 2. To this end, this central portion 9 has consumable or collapsable protrusions 10 intended to be used for carrying out the projection welding. The remaining two side portions of inner contour of the half ring, on the contrary, have a radius slightly larger than that of the central portion 9, and accordingly they will remain separated from the half ring, as shown in FIG. 1. The half ring may, finally be machined (by material removal or by coining) for forming therein recessed lubrication grooves 11.

After having machined and finished in this way the separate components, two flanges and a half bearing are brought together in the correct mutual position with the flanges disposed over the seats, and a welding by projection or by condenser discharge is performed between the central portion 9 of the inner contour of the half rings and the seats 3 which are located on the outer axially extending surfaces of the half bearing. FIGS. 3 and 4 show that before welding, the radial protrusions 10 will initially contact the mounting seat 3. FIGS. 1 and 2 show that after welding the central portion 9 subsequently contacts the mounting seat. The welding can be carried out without any difficulty, since these parts have no antifriction coatings, and it ensures a sufficiently sturdy connection. The welding operation, owing to the appropriate choice of the welding process, does not deteriorate the antifriction layers, not even in the regions nearest the welding spots, nor does it give rise to any deformation of the components which could render necessary a further machining of these latter. Simple grasping implements retain the components exactly in the prefixed position during the welding operation, in a manner per se well known, so that by this process flanged half bearings are obtained, which are completely finished in compliance with the predetermined dimensions.

As it will be appreciated, by the use of this invention flanged half bearings can be manufactured, which have features equivalent to or even higher than those of the corresponding integral half bearings or of the half bearings composed by folded seaming, but with drastically reduced production costs. Taking into account the considerable cost reduction of the production equipment, the simplification of the working procedures, and the working time reduction, the resulting whole reduction in the production cost of such half bearings may result in the order of 50%.

I claim:

1. A flanged half bearing, comprising:
    A plain half bearing having an axially extending outer surface portion; and
    at least one thrust flange disposed over and rigidly connected to said axially extending outer surface portion of said plain half bearing by a projection weld, said projection weld being formed with collapsable radial projection means provided on said at least one thrust flange such that said projection weld prevents deformation of said plain half bearing and prevents deformation of said at least one thrust flange during formation of said projection weld.

2. The bearing of claim 1, wherein said axially extending outer surface portion of said plain half bearing comprises an axially extending recessed mounting seat for connection to said at least one thrust flange.

3. The bearing of claim 1, wherein said projection weld is formed by capacitor discharge.

4. The bearing of claim 1, wherein said thrust flange comprises an antifriction layer and wherein said projection weld prevents deterioration of said antifriction layer.

5. The bearing of claim 1, wherein said plain half bearing comprises an antifriction layer and wherein said projection weld prevents deterioration of said antifriction layer.

6. The bearing of claim 5, wherein said antifriction layer extends up to axial end portions of said plain half bearing.

* * * * *